(12) United States Patent
Fagundes et al.

(10) Patent No.: US 11,727,288 B2
(45) Date of Patent: Aug. 15, 2023

(54) DATABASE-MANAGEMENT SYSTEM WITH ARTIFICIALLY INTELLIGENT VIRTUAL DATABASE ADMINISTRATION

(71) Applicant: KYNDRYL, INC., New York, NY (US)

(72) Inventors: Cristina L. Fagundes, Campinas (BR); Sergio L. Fagundes, Campinas (BR)

(73) Assignee: Kyndryl, Inc., New York, NY (US)

( * ) Notice: Subject to any disclaimer, the term of this patent is extended or adjusted under 35 U.S.C. 154(b) by 1704 days.

(21) Appl. No.: 15/285,646

(22) Filed: Oct. 5, 2016

(65) Prior Publication Data

US 2018/0096252 A1  Apr. 5, 2018

(51) Int. Cl.
  *G06N 5/045*  (2023.01)
  *G06F 16/21*  (2019.01)
  *G06N 20/00*  (2019.01)

(52) U.S. Cl.
  CPC ............. *G06N 5/045* (2013.01); *G06F 16/21* (2019.01); *G06N 20/00* (2019.01)

(58) Field of Classification Search
  None
  See application file for complete search history.

(56) References Cited

U.S. PATENT DOCUMENTS 6,944,630 B2   9/2005   Vos et al.
6,996,576 B2   2/2006   Vos et al.
(Continued)

FOREIGN PATENT DOCUMENTS

EP         1331564        7/2003
WO    WO2004023228       3/2004
(Continued)

OTHER PUBLICATIONS

Winland, M, "Performance Impacts of Data Volume," verified online as of Mar. 2015 from <web.archive.org/web/20150317234916/ https://use-the-index-luke.com/sql/testing-scalability/data-volume> (Year: 2012).*

(Continued)

*Primary Examiner* — Brian M Smith
(74) *Attorney, Agent, or Firm* — Dan Housley; Hunter E. Webb; Keohane & D'Alessandro, PLLC (57) ABSTRACT

A method and associated systems for a database-management system with artificially intelligent database administration. The DBMS manages one or more databases, each of which is monitored by sensors that detect conditions indicative of database performance. An operational engine receives input from the sensors, translates it into a form understandable by an artificially intelligent decision engine, and forwards the translated input to the decision engine. The decision engine uses preloaded knowledge elements stored in a knowledgebase to infer whether the sensor input identifies an issue that can only be resolved by a database-administration activity. If so, the decision engine attempts to select a best solution, optionally seeks confirmation of its selection from an outside source, and directs the operational engine to implement the selected solution. The relative success of the solution is fed back to the knowledgebase, allowing the system, by means of machine learning, to continuously improve accuracy and effectiveness.

20 Claims, 5 Drawing Sheets

(56) References Cited

U.S. PATENT DOCUMENTS

| | | | |
|---|---|---|---|
| 7,143,120 | B2 | 11/2006 | Oks et al. |
| 7,366,740 | B2 | 4/2008 | Sleeman et al. |
| 7,440,973 | B2 | 10/2008 | Tsukerman et al. |
| 7,565,377 | B2 | 7/2009 | Watson |
| 7,571,225 | B2 | 8/2009 | Devraj et al. |
| 7,853,538 | B2 | 12/2010 | Hildebrand |
| 8,010,337 | B2 | 8/2011 | Narayanan et al. |
| 8,140,565 | B2 | 3/2012 | D'Angelo et al. |
| 8,504,534 | B1 | 8/2013 | Tendick et al. |
| 8,713,061 | B1 | 4/2014 | Sheth et al. |
| 9,639,414 | B1* | 5/2017 | Wu ............... G06F 11/0793 |
| 9,772,639 | B2* | 9/2017 | Farber ............ H03K 5/2481 |
| 9,904,587 | B1* | 2/2018 | Potlapally ...... G06F 11/3419 |
| 10,108,669 | B1* | 10/2018 | Krishnamoorthy ................... G06F 16/24554 |
| 2003/0229625 | A1 | 12/2003 | Melchior et al. |
| 2005/0080799 | A1 | 4/2005 | Harnden et al. |
| 2006/0026212 | A1 | 2/2006 | Tsukerman et al. |
| 2007/0112714 | A1 | 5/2007 | Fairweather |
| 2008/0168018 | A1* | 7/2008 | Rohlfing ............ H04L 41/16 706/47 |
| 2009/0172044 | A1 | 7/2009 | Page et al. |
| 2014/0064066 | A1 | 3/2014 | Lumezanu et al. |
| 2014/0143782 | A1 | 5/2014 | Shekar et al. |
| 2016/0357625 | A1* | 12/2016 | Balakrishnan ...... G06F 11/0793 |
| 2017/0048314 | A1* | 2/2017 | Aerdts ............ H04L 67/1097 |
| 2017/0060542 | A1* | 3/2017 | Mandal ............ G06F 16/835 |
| 2017/0083390 | A1* | 3/2017 | Talwadker ......... G06F 11/0748 |
| 2017/0169059 | A1* | 6/2017 | Horowitz ............ G06F 16/211 |
| 2018/0060752 | A1* | 3/2018 | Gross .................... G06F 11/00 |

FOREIGN PATENT DOCUMENTS

| | | |
|---|---|---|
| WO | WO2008003077 | 1/2008 |
| WO | WO2013072925 | 5/2013 |

OTHER PUBLICATIONS

Wu, L. et al., "SLA-based resource provisioning for hosted software-as-a-service applications in cloud computing environments," IEEE Trans. on Services Computing, vol. 7, No. 3 (Jul. 2014) pp. 465-485 (Year: 2014).*

Liu, R. et al., "Big data architecture for IT incident management," Proc. of 2014 IEEE Intl. Conf. on Service Operations and Logistics (2014) pp. 424-429. (Year: 2014).*

Munoz, A. et al., "Architecture for an intelligent distributed database," Proc. of the 13th Euromicro Conf. on Parallel, Distributed, and Network-Based Processing (2005) 7 pp. (Year: 2005).*

Sharma1, et al., A Framework for Automated Database Tuning Using Dynamic SGA Parameters and Basic Operating System Utilities, Database Systems Journal vol. 111, No. 4/2012, pp. 25-32.

Mell, Peter et al.; "The NIST Definition of Cloud Computing;" National Institute of Standards and Technology; Special Publication 800-145; Sep. 2011; 7 pages.

* cited by examiner

DATABASE-MANAGEMENT SYSTEM WITH ARTIFICIALLY INTELLIGENT VIRTUAL DATABASE ADMINISTRATION

BACKGROUND

A database-management system (DBMS) must be continuously monitored and fine-tuned by a database administrator (DBA) in order to maintain the integrity, availability, accuracy, and currency of data stored in each database, and to ensure that each database can be accessed quickly and efficiently.

Unlike transactional activities that update data or other content stored in a database, a DBA's administrative tasks are mostly operational in nature, such as backing up, restoring, reorganizing, accumulating, compressing, migrating, maintaining the data integrity of, logging transactions and errors of, and documenting a database. If, for example, a database's response time increases beyond a threshold limit specified by a service agreement, a DBA might attempt to resolve this issue by adjusting the database's performance-related parameters or by moving the DBMS to a faster hard drive. In another case, a DBA might adjust a backup schedule and encryption settings of a database that has just begun to host mission-critical data.

Such administrative and operational tasks require skilled IT personnel familiar with the platforms, underlying technologies, hardware components, software applications, and other components of and characteristics associated with each database comprised by a DBMS. These tasks may become complex and resource-intensive when a distributed DBMS or cloud-based DBMS comprises multiple databases stored on different platforms or accessed through virtual infrastructure, including cloud-computing environments. Such systems sometimes require multiple DBAs to support these multiple operating environments.

There is thus a need for a database-management system that is platform-independent and self-administering, in order to mitigate the expense, risk of errors, variable response times, and other constraints that accompany human-based database administration.

BRIEF SUMMARY

One embodiment of the present invention provides a artificially intelligent DBMS system, comprising a processor, a memory coupled to the processor, a local computer-readable hardware storage device coupled to the processor, a set of databases, a set of computer-readable database-storage devices coupled to the processor that each store at least one database of the set of databases, and a set of sensors coupled to the processor that monitor parameters associated with the set of databases, the storage device containing program code configured to be run by the processor via the memory to implement a method for a database-management system with artificially intelligent database administration, the method comprising:

the processor of the DBMS system receiving input from a sensor of the set of sensors;

the processor determining through artificial intelligence, as a function of information stored in a knowledgebase of the DBMS system, whether the input identifies an issue that adversely affects a functioning of any database of the set of databases;

the processor, if determining that the input identifies an issue that adversely affects a functioning of any database of the set of databases:

identifying through artificial intelligence, as a function of information stored in the knowledgebase, a set of candidate resolutions to the issue;

selecting through artificial intelligence, as a function of information stored in the knowledgebase, a candidate resolution that has a higher confidence of being successful than do other resolutions of the set of candidate resolutions;

performing steps of the selected candidate solution upon the set of databases; and updating the knowledgebase as a function of the selecting.

Another embodiment of the present invention provides a method for a database-management system with artificially intelligent database administration, the method comprising:

a processor of an artificially intelligent DBMS system receiving input from a sensor of a set of sensors, where the set of sensors monitors parameters associated with a set of databases;

the processor determining through artificial intelligence, as a function of information stored in a knowledgebase of the DBMS system, whether the input identifies an issue that adversely affects a functioning of any database of the set of databases;

the processor, if determining that the input identifies an issue that adversely affects a functioning of any database of the set of databases:

identifying through artificial intelligence, as a function of information stored in the knowledgebase, a set of candidate resolutions to the issue;

selecting through artificial intelligence, as a function of information stored in the knowledgebase, a candidate resolution that has a higher confidence of being successful than do other resolutions of the set of candidate resolutions;

communicating the selection to a human database administrator through the interactive user interface;

receiving in response to the communicating a communication from the human database administrator indicating whether a step of the selected candidate solution should be revised prior to the performing;

performing steps of the selected candidate solution upon the set of databases by directing one or more database-storage devices, which each store at least one database of the set of databases, to perform actions that improve an efficiency or an accuracy of one or more of the set of databases; and updating the knowledgebase as a function of the selecting.

Yet another embodiment of the present invention provides a computer program product, comprising a computer-readable hardware storage device having a computer-readable program code stored therein, the program code configured to be executed by an artificially intelligent DBMS system, comprising a processor, a memory coupled to the processor, a local computer-readable hardware storage device coupled to the processor, a set of databases, a set of computer-readable database-storage devices coupled to the processor that each store at least one database of the set of databases, and a set of sensors coupled to the processor that monitor parameters associated with the set of databases, the storage device containing program code configured to be run by the processor via the memory to implement a method for a database-management system with artificially intelligent database administration, the method comprising:

the processor receiving input from a sensor of the set of sensors;

the processor determining through artificial intelligence, as a function of information stored in a knowledgebase of the DBMS system, whether the input identifies an issue that adversely affects a functioning of any database of the set of databases;

the processor, if determining that the input identifies an issue that adversely affects a functioning of any database of the set of databases:

identifying through artificial intelligence, as a function of information stored in the knowledgebase, a set of candidate resolutions to the issue;

selecting through artificial intelligence, as a function of information stored in the knowledgebase, a candidate resolution that has a higher confidence of being successful than do other resolutions of the set of candidate resolutions;

communicating the selection to a human database administrator through the interactive user interface;

receiving in response to the communicating a communication from the human database administrator indicating whether a step of the selected candidate solution should be revised prior to the performing;

performing steps of the selected candidate solution upon the set of databases by directing one or more storage devices of the set of database-storage devices to perform actions that improve an efficiency or an accuracy of one or more of the set of databases; and updating the knowledgebase as a function of the selecting.

DETAILED DESCRIPTION

Embodiments of the present invention comprise an enhanced database-management system (DBMS) that incorporates artificially intelligent, self-learning database-administration functionality.

Embodiments also comprise other unique elements not found in most DBMS systems, including sets of hardware and software sensors that monitor conditions of each database managed by the DBMS. These sensors report events and conditions to the DBMS's artificially intelligent DBA module, which then uses a machine-learning or analytics AI knowledgebase or ontology to infer whether the reported data identifies an issue that must be resolved by a sequence of administrative or operational functions. If an issue is inferred, the DBMS then identifies candidate sequences of administrative or operational functions likely to resolve the issue, and then selects the candidate that has a greatest likelihood of being an efficient resolution.

The DBMS's DBA-like functionality, like other artificially intelligent software, becomes more proficient with experience, as it uses continuously accumulating information to enhance its knowledgebase. This information may, for example, comprise sensor input, feedback regarding the success and efficiency of an attempted issue resolution, or feedback from a human or automated database-administrator. In one example, an embodiment of the present invention may fine-tune the knowledgebase rules and concepts it uses to make decisions by observing, through the sensors, how effective its actions have been in the past. When using techniques of artificial intelligence, such as real-time analytics, to infer meaning from sensor input, certain embodiments may further infer more subtle patterns by considering other factual data and rules in combination with the sensor output.

Embodiments of the present invention may be implemented as physical database systems comprising both novel and known DBMS components, such as the artificially intelligent DBA, hardware sensors, software sensors, hardware storage devices, and communications or networking mechanisms. Other embodiments may be provisioned as software-as-a-service (SaaS) or platform-as-a-service (PaaS) cloud-computing services or as mainframe resources, comprising components implemented as either as software applications or as integrated hardware/software systems, modules, or other software entities.

Figure 4:
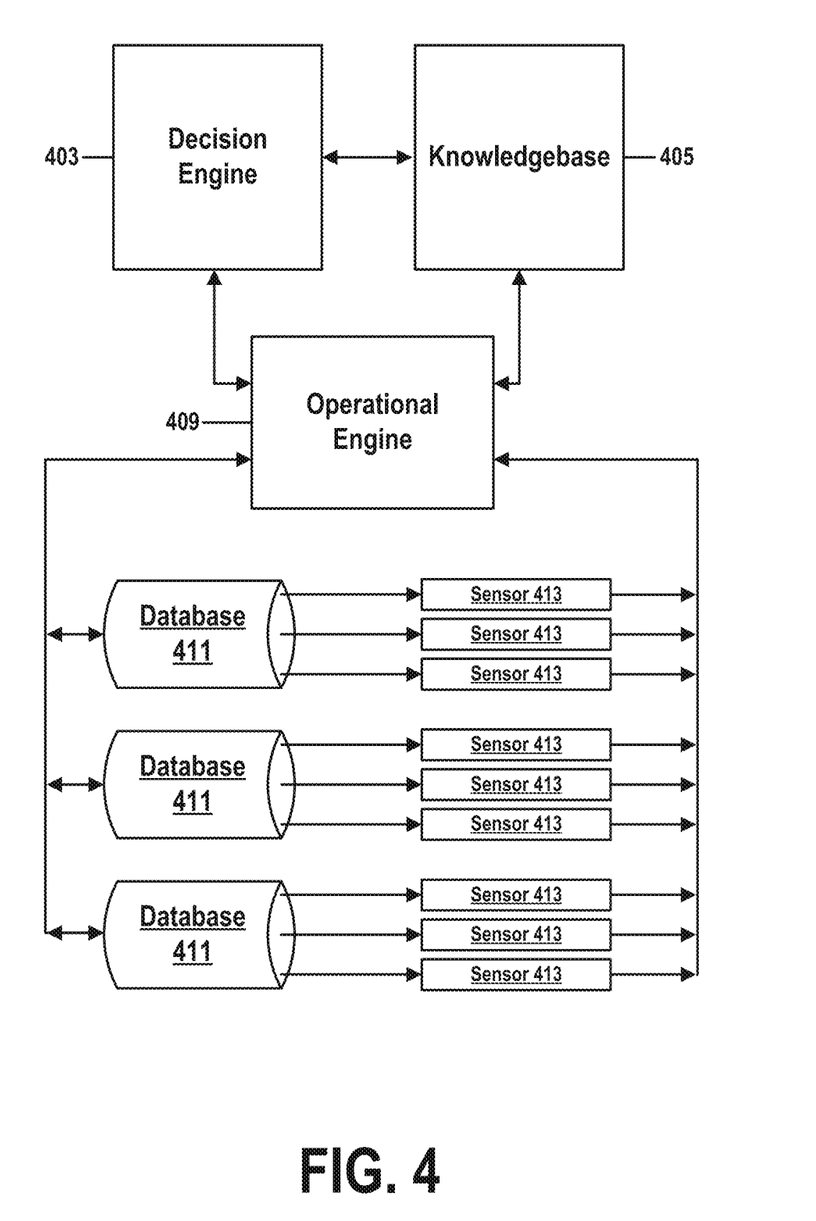
FIG. 4 shows the structure of a database-management system with artificially intelligent database administration in accordance with embodiments of the present invention.

Embodiments may also be implemented as an enterprise or distributed database, incorporating multiple distinct databases that may span different operating systems, platforms, physical locations, and cloud-computing environments, and that may be implemented in different or proprietary database formats. An operational engine 409 provides an interface between these distributed databases and the DBMS's artificially intelligent decision-making modules. In this way, methods of the present invention are transparent to the physical or virtual platforms upon which each database is stored and maintained, and may thus be implemented in a manner that is compatible with any brand or format of DBMS, any programming language, any query language, any physical or virtualized platform or computer-readable storage medium, and any operating system.

In some embodiments, the DBMS may include an optional ability to interact with a human DBA. This function may facilitate training of the DBMS's artificially intelligent components or may be used as a fallback mechanism when the DBMS's artificial intelligence encounters an issue that it does not yet have sufficient experience to resolve.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
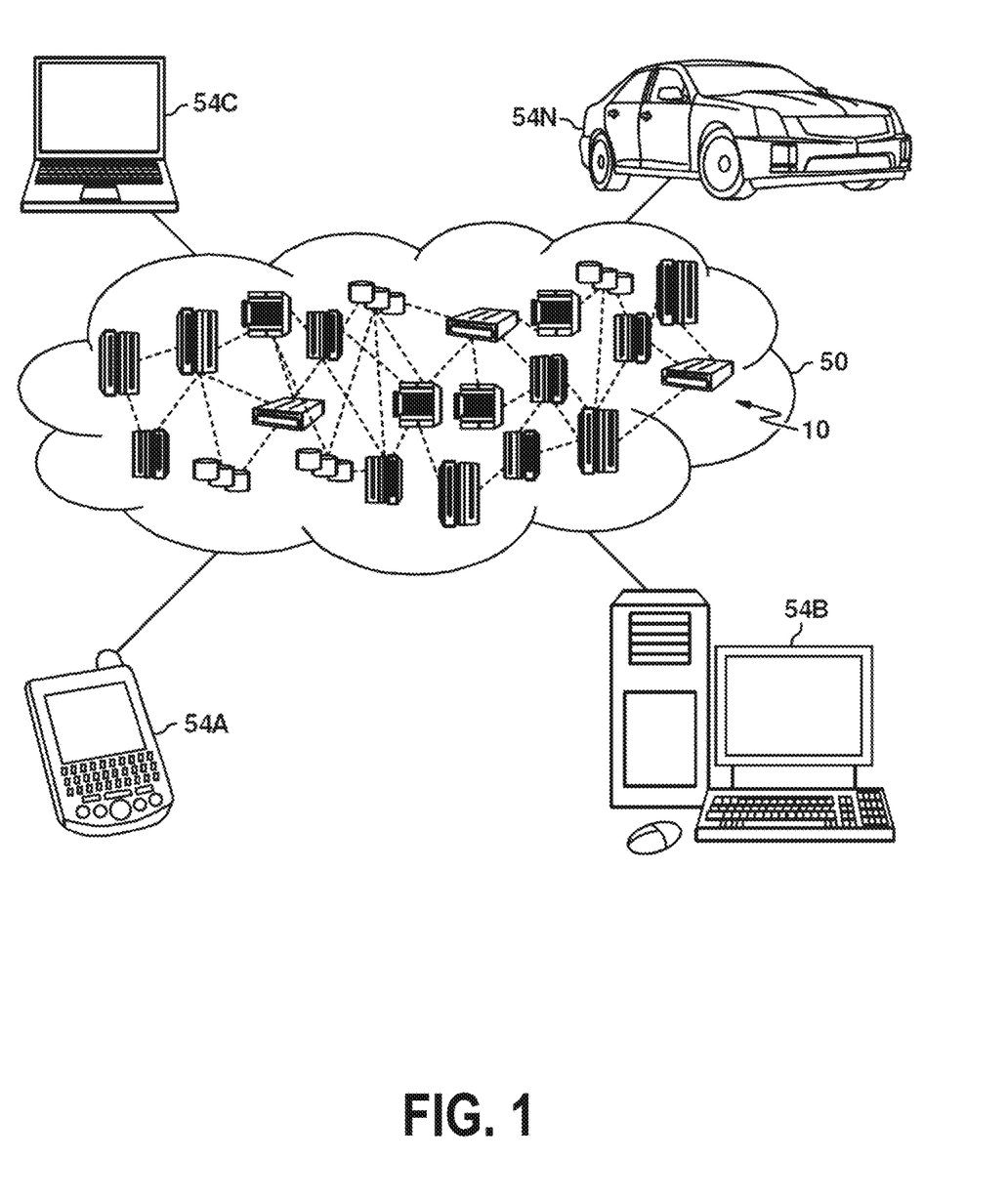
FIG. 1 shows an example of a cloud-computing environment.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
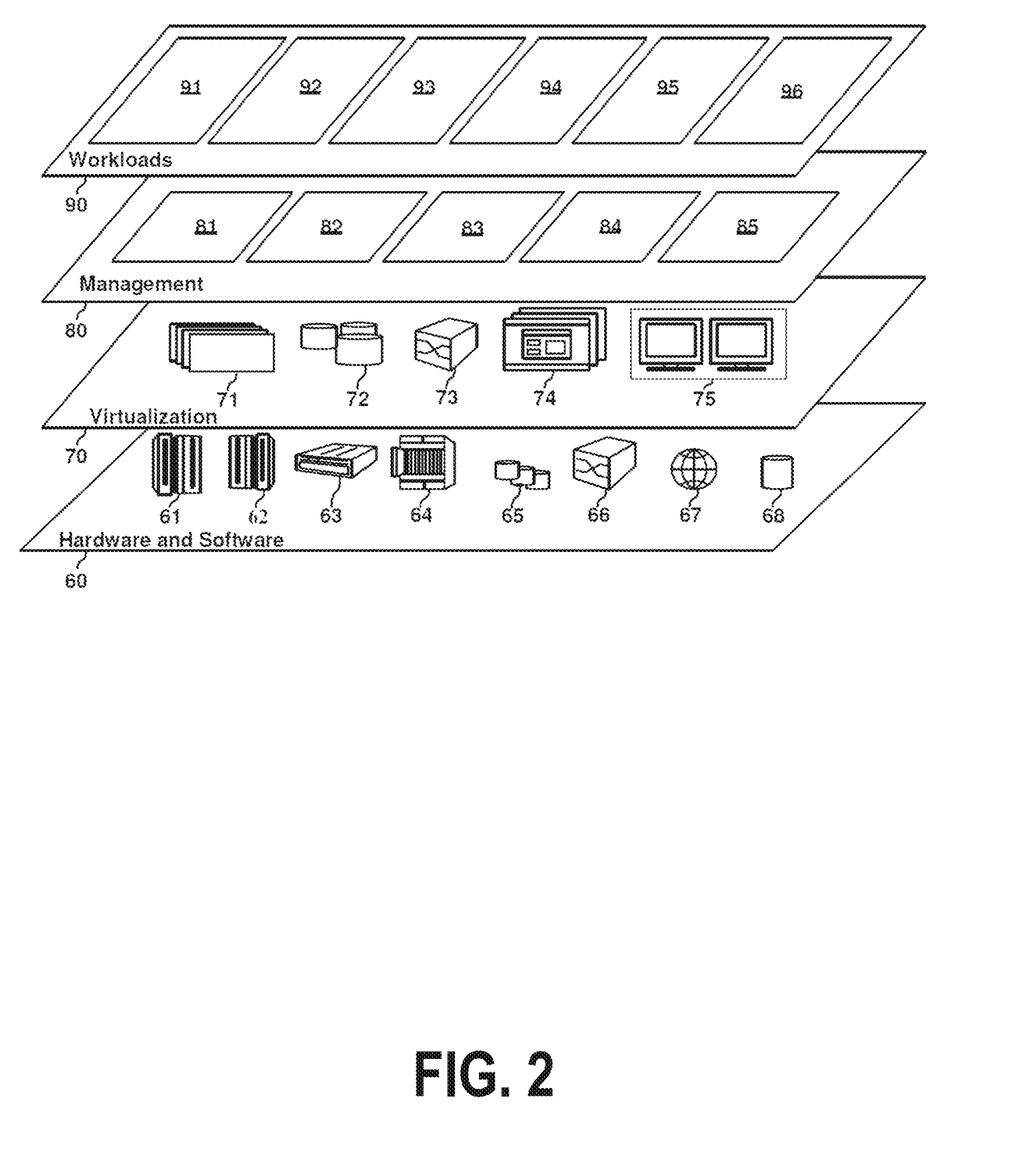
FIG. 2 illustrates a set of functional abstraction layers provided by a cloud-computing environment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and artificially intelligent database administration.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
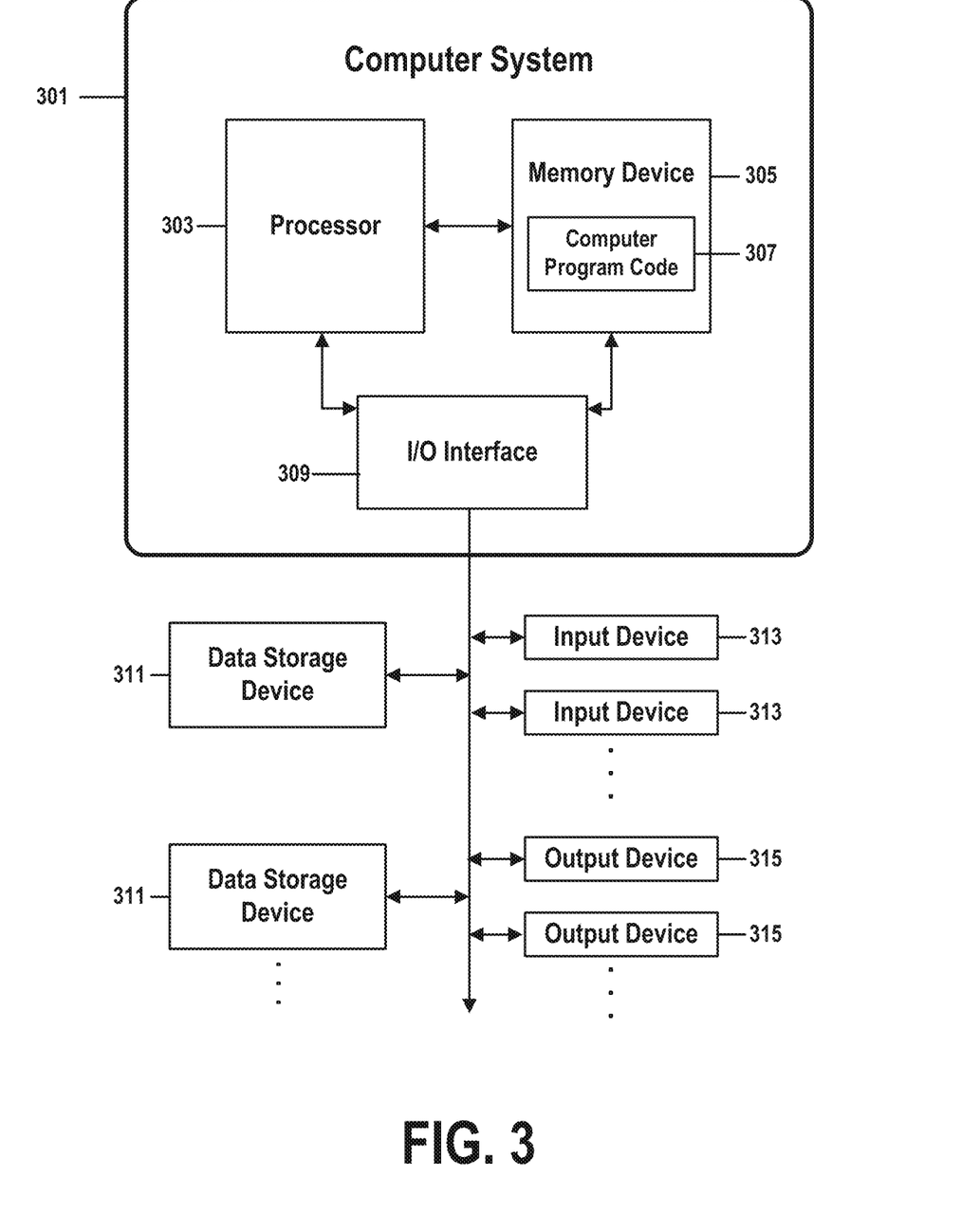
FIG. 3 shows the structure of a computer system and computer program code that may be used to implement a method for a database-management system with artificially intelligent database administration in accordance with embodiments of the present invention.

FIG. 3 shows a structure of a computer system and computer program code that may be used to implement a method for a database-management system with artificially intelligent database administration in accordance with embodiments of the present invention. FIG. 3 refers to objects 301-315.

In FIG. 3, computer system 301 comprises a processor 303 coupled through one or more I/O Interfaces 309 to one or more computer-readable hardware data storage devices 311 and one or more I/O devices 313 and 315.

Hardware data storage devices 311 may include, but are not limited to, non-transitory magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Storage devices 311 may, as described above, be used to store program code for implementing components of the present invention. Other storage devices 311 may be used to store databases managed by a DBMS in accordance with embodiments of the present invention. These database-storage devices 311 may comprise non-transitory physical computer-readable media, virtual storage devices provisioned on a virtual infrastructure or in a cloud-computing environment, or other types of computer-readable hardware storage devices known in the art. In either case, they may be distributed across multiple platforms or situated at different physical locations. FIG. 4 shows an exemplary embodiment of the present invention that includes several such remote databases 411.

Similarly input devices 311 may, as described above, be used to perform conventional I/O activities of a computer system. Input devices 311 may also comprise a set of sensors that may each comprise physical hardware or software agents. These sensors 311 detect conditions related to data stored in a database, environmental conditions, performance or contractual requirements, and other issues related to managing a database. Sensors 311 may be implemented as real or virtual entities and may be distributed across multiple platforms or situated at different physical locations, optionally in proximity to a particular database. FIG. 4 shows an exemplary embodiment of the present invention that includes such sensors 413.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for a database-management system with artificially intelligent database administration in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for a database-management system with artificially intelligent database administration.

Any of the components of the present invention could be created, integrated, hosted, maintained, deployed, managed, serviced, supported, etc. by a service provider who offers to facilitate a method for a database-management system with artificially intelligent database administration. Thus the present invention discloses a process for deploying or integrating computing infrastructure, comprising integrating computer-readable code into the computer system 301, wherein the code in combination with the computer system 301 is capable of performing a method for a database-management system with artificially intelligent database administration.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

While it is understood that program code 307 for a method for a database-management system with artificially intelligent database administration may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for a database-management system with artificially intelligent database administration is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

FIG. 4 shows the structure of a database-management system (DBMS) with artificially intelligent database administration in accordance with embodiments of the present invention. FIG. 4 comprises items 403-413.

FIG. 4 omits certain elements of the DBMS that are known in the art, such as interactive user interfaces, a query-language facility, virtualization components, and extrinsic network infrastructure. Readers should not construe this to mean that such components are absent from all embodiments of the present invention. Some embodiments may include some or all components shown in FIG. 4, along with other known components of a database-management system or a machine-learning application.

Decision Engine (DE) 403 embodies the DBMS'S artificially intelligent DBA functionality. In some embodiments, DE 403 may be implemented as a distinct module, possibly in an environment or on a platform distinct from those of other components 405-413. DE 403 may thus be platform-independent, enabling it to administer the DBMS's databases regardless of where or how databases 411, sensors 413, and other components are implemented.

Decision Engine 403 receives and analyzes data forwarded by Operational Engine 409 to DE 403 from sensors 413. DE 403 uses methods of artificial intelligence, such as analytics, to infer meaning to sensor input and to information stored in knowledgebase 405, in order to respond to the received input. If, for example, DE 403 infers meaning to sensor input that implies the existence of an issue that must be addressed, DE 403 may, by means of known methods of artificial intelligence, identify administrative or operational actions capable of resolving the inferred issue.

Decision Engine 403, by means of its AI-based machine-learning capabilities, can use information stored in knowledgebase 405 to infer the existence of a condition suggested by received sensor input, such as a temporary or permanent infrastructure change, a change in a hardware condition, or an update to a characteristic of a database.

Knowledgebase 405 may use known methods of artificial intelligence to represent stored knowledge as rules and concepts. The artificially intelligent Decision Engine 403 may use this stored knowledge to infer meaning to sensor input, to identify issues capable of affecting operation of one or more databases 411, to determine characteristics of planned administrative or maintenance tasks, to identify, rank, and select candidate resolutions capable of resolving an issue, or to perform any other function related to the administration of any of the databases 411.

In some embodiments, Decision Engine 403 may, through an optional user interface, be capable of interacting with a human database administrator or other user. Although certain embodiments may self-operate without human intervention, situations may occur in which human interaction is desirable, such as when it is necessary to override a decision made by the Decision Engine 403, when Decision Engine 403 cannot identify a best course of action in order to resolve an issue, when the Decision Engine 403 is still being trained or encounters a new situation for which it has not yet received training, or when the Decision Engine 403 must for any other reason request information from or notify the human database administrator of a pertinent condition or event. Such communications may be made through any means known in the art, such as through a TCP/IP Internet connection, a hardwired connection, a wireless connection, or another type of network connection.

Knowledgebase 405 stores information used by the Decision Engine 405 to interpret and decide how to respond to sensor input. The knowledgebase 405 is a conventional knowledgebase, known in the arts of machine-learning and artificial intelligence, and may store rules and concepts (or inferential logic and facts) as an ontology, a triple-store, or any other data structure known in the art to be a component of an AI knowledgebase.

In some embodiments, a knowledgebase 405 may be preloaded with information that identifies an initial state of the system. This preloaded information comprise any information deemed by implementers to be relevant to the operation of a database 411 or that is known in the art to be necessary for the correct operation of a machine-learning application or database-management system. Examples of such information include descriptions of databases comprised by the DBMS system; rules, facts, logic, and relations from which patterns or meanings may be inferred; lists of operational or administrative actions to be undertaken in response to certain conditions or events; business policies; contractual obligations; and other elements of logic and data.

DE 403 may access knowledgebase 405 whenever DE 403 receives sensor input in order to infer meaning to the input, to select candidate resolutions to an issue or undesirable condition identified by the input, or to identify a candidate resolution that has a highest confidence of being a resource-efficient or likely to be successful.

Operational Engine (OE) 409 is an interface between the artificially intelligent Decision Engine 403 and physical components of the DBMS system, including databases 411 and sensors 413.

In embodiments where databases 411 are not all installed on similar platforms, a distinct Operational Engine 409 may be implemented for each database platform, where each OE 409 is configured to interface with a particular platform. In the most general case, each Operational Engine 409 translates commands, queries, and other communications from a database environment into a form that is understandable by the Decision Engine 403. This mechanism allows embodiments to provide database-administration functions to multiple incompatible databases implemented in different operating environments or platforms.

The Operational Engine 409 may also interface the DE 403 to other DBMS modules or with the operating system under which the DBMS runs. This may allow the DBMS to perform physical actions, such as migrating, backing up, reorganizing, or allocating new clusters to a database, as a function of inferences and decisions made by the DE 403, referencing information stored in knowledgebase 405. In some embodiments, the OE 409 may also log operations performed by the Decision Engine 403 or other modules of the DBMS.

In some embodiments, the OE 409 may serve as an internal communications hub for other modules of the present invention. An OE 409 may, for example, comprise interfaces to Decision Engine 403, sensors 413, the DBMS's operating system, storage devices on which databases 411 are installed, and other components.

Operational Engine 409 is responsible for end-to-end management and performance of tasks requested by the Decision Engine 403 in response to sensor data forwarded to DE 403 by OE 409. This end-to-end management may include tasks like logging a record of each DE 403 or OE 409 activity to a log file. OE 409 may also perform other related tasks, such as translating communications between a form understandable by the Decision Engine 409 and a form understandable by a database 411 or by a platform upon which a database 411 is installed; implementing tasks initiated by a previously scheduled automated job; requesting status from a database 411 or from a platform on which a database 411 is installed; or collecting performance data for each operation requested by the Decision Engine 403.

Databases 411 are one or more conventional data-storing databases that generally require the types of administrative tasks identified by Decision Engine 403. databases 411 may be implemented by any means known in the art, each residing, for example, on one or more physical computer-readable storage devices or storage media, as virtual storage provisioned on virtual infrastructure, or as a component of a cloud-computing platform. A database 411 may be divided among multiple storage media or platforms, where each component of the database 411 may be capable of communicating independently with other components of the DBMS. It is possible for various databases 411 to be installed on different platforms, under different operating systems, or in different application environments, or to be configured to use different message formats or query languages in order to communicate with users or extrinsic systems.

One or more sensors 413 may each monitor characteristics of one or more database 411 or of a storage device upon which a database 411 is installed, of environmental conditions associated with a database 411 or storage device; of performance, response time, or other benchmark parameters of a database 411 or storage device; or of any other parameter or benchmark associated with a characteristic of the DBMS, its components, its platforms, or its operating environments.

Some or all of sensors 413 may be hardware devices, such as a temperature or moisture sensor or an intrusion alarm; software components, such as an agent or bot; or integrated hardware/software devices, such as a programmable motion sensor. What is important is that each sensor 413 must be capable of tracking one or more type of event relevant to the operation of a database 411 and, through any known type of communications mechanism, be able to communicate the sensor's tracked data to the Decision Engine 403 through the Operational Engine 409.

In some embodiments one or more sensors 413 may be capable of receiving data from other DBMS or extrinsic modules or components, such as an operating system-management console, a file produced by or communicated by a batch application, a DBMS tool or API, a user interface, a repository of policy or technical constraints, or other sources deemed relevant by an implementer.

In general, a sensor 413 resides at or near a platform or storage device upon which one or more corresponding databases 411 are installed. This residing may comprise locating a hardware sensor 413 in physical proximity to a database-storage device or to a hardware, software, or virtualized platform upon which a database 411 is stored, or may comprise implementing a software sensor 413 in a format that is compatible with an operating system, programming language, or other characteristic of a database 411 or of a platform upon which a database 411 is stored.

A sensor 413 may be configured to operate as a background process or another type of low-overhead process in order to avoid affecting DBMS performance or unnecessarily consuming other resources. A sensor 413 may be configured to track one specific type of events or may be configured to track multiple types of events. These events may include, for example, an opening, closing, or archiving of a log file; a database initialization, start-up, cloning, or shutdown; a notification of a scheduled backup procedure; an out-of-range temperature reading; an unacceptable average response time; or an overcapacity condition of a storage medium.

A sensor 413 may attempt to detect events of interest continuously, periodically, at random intervals, at other scheduled times, when a predetermined condition occurs, or at the request of the Decision Engine 409 or of a human database administrator or system implementer.

Although every embodiment comprises sensors 413 that directly detect characteristics of databases 411, some embodiments may comprise other types of sensors 413. These other types may perform functions like: monitoring an operating-system console in order to track certain types of console messages or to determine whether tasks requested by the DE 403 have completed successfully; monitoring a storage system, medium, or device in order to capture error messages, monitor available storage capacity, or monitor environmental parameters such as external air temperature or media temperatures; monitoring batch applications and other software jobs like backup operations, database reorganizations, or compression operations in order to determine whether each database 411 continues to satisfy contractual obligations of service-level requirements; and monitoring data generated by database tools, such as a database-console application or a performance-tracking utility.

Figure 5:
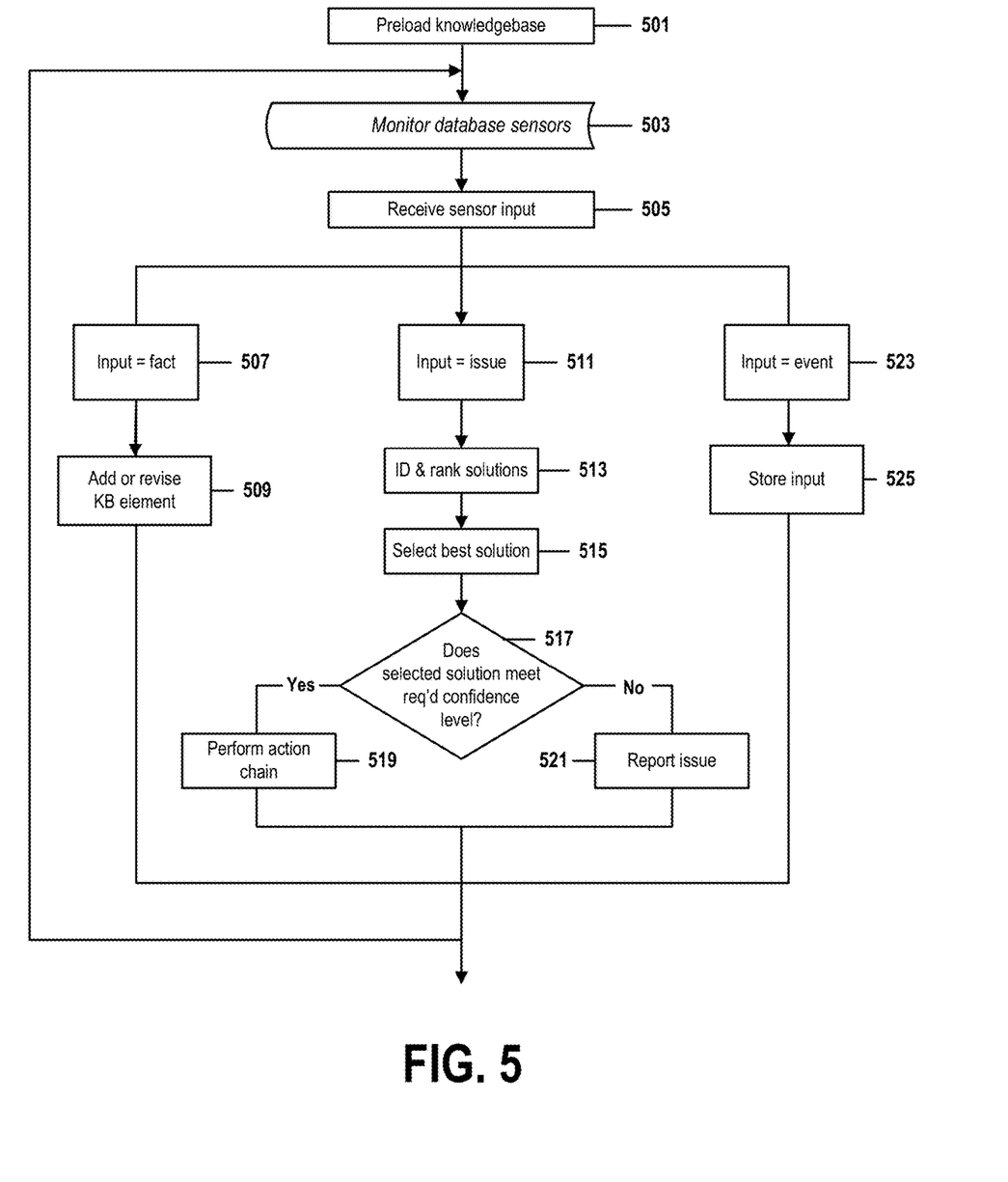
FIG. 5 is a flow chart that illustrates the steps of a method for a database-management system with artificially intelligent database administration in accordance with embodiments of the present invention.

FIG. 5 is a flow chart that illustrates steps of a method for a database-management system with artificially intelligent database administration in accordance with embodiments of the present invention. FIG. 5 contains steps 501-525.

In step 501, a processor of the artificially intelligent DBMS system of FIG. 4 preloads knowledgebase 405 with information. This information may be used by Decision Engine 403 to identify administrative or operational functions to perform upon databases 411 in response to an identification of an unresolved issue. As the DBMS system continues to operate over time, the knowledgebase 405 will continue to be updated through any sort of machine-learning or other self-learning process known in the art. In this way, the artificially intelligent DBMS continues to improve its efficiency and accuracy of operation.

The preloaded information comprises elements of intelligence that may include, but are not limited to:

an inventory of databases 411 that identifies characteristics of each database 411. These characteristics may include initial database configurations, technical constraints like a physical storage-capacity limitation, a database's format or structure, a query language that is compatible with a database, or a maximum database size.

preloaded policies that identify constraints, threshold values, requirements, and other parameters that identify factors necessary in order for the databases 411 to comply with internal policy or contractual requirements. A service-level policy may, for example, require database response time to fall below a certain threshold level and a general IT policy may require a database to be split or to be allocated more storage when it exceeds a certain size.

action chains that identify sequences of steps that Decision Engine 403 may select as a candidate response to an issue that requires an administrative response.

facts that identify any other information of importance to each database and the environment and platform within which it operates. A fact might, for example, identify an amount of available storage capacity remaining on a hard drive, a revision number of a network-management utility, an infrastructure or network topology, a location of a hardware, software, or virtual component of an infrastructure, a relationship between components (such as an association between a database and a backup storage unit or a dependency relationship between a hardware device and a software application hosted by that device), a priority or security level of a user or component, or a pathname of a most current log file. The Decision Engine 403 will self-learn by using incoming sensor input to update facts stored in the knowledgebase 405 and to add new facts to the knowledgebase 405.

and miscellaneous event that store information received from sources like sensors 413, and which are judged by the Decision Engine 403 to be unrelated to the DBMS's DBA-like functionality.

An element of intelligence may, for example, comprise knowledge that a particular database 411 must be taken offline during a backup procedure. Such a fact may be considered an element of a database-backup process model. As is known in the art, the information stored in knowledgebase 405 may be organized or interpreted as defining numerous such process models. Other models might, for example, model processes like a database-compression process, a new-user initialization process, or an application-upgrade process. Knowledge stored in knowledgebase 405 may also comprise models of specific types of administrative issues and models of specific solutions or resolutions to each type of administrative issue.

This information may be represented in a manner consistent with known methods of representing knowledge or inferential logic in a knowledgebase. For example, knowledgebase 405 may store information as rules and concepts in an ontology, as a set of triple-store data structures, or in any other data structure or format that may be used to represent inferential logic, patterns, and other types of logical information known to be stored in a AI knowledgebase.

As is known in the art, rules in this context may define logic to be followed by the Decision Engine 403 when identifying sensor input, selecting a response to an input, determining whether one action chain is a more appropriate response than another, and other DBA-like activities. Rules may, for example, allow the Decision Engine 403 to identify an issue as a function of sensor input, to select from the knowledgebase 405 candidate action chains likely to resolve the issue, and to then determine which candidate action chain has the highest confidence factor of success. Similarly, in this context, concepts may identify facts, conditions, tokens, or other entities that may serve as meaningful subjects, predicates, or objects of rules.

These examples should not be construed to limit the range of possible embodiments of the present invention. The structure, format, and internal organization of knowledgebase 405 is transparent to embodiments of the present invention, which may accommodate any sort of knowledgebase known in the art.

Step 503 begins an iterative procedure of steps 503-525 that may repeat indefinitely. If desired by an implementer, it may be performed a certain number of times or may be performed for a preset duration of time.

While the iterative procedure runs, the processor monitors output of sensors 413 through means known in the art, such as a hardwired connection, a virtual or real network connection, or another type of communications interface between each sensor 413 and the Operational Engine 409 module.

Each sensor 413 may be a software component, such as a bot, an agent, a script or scheduled query, a logging utility, an infrastructure-monitoring or network-monitoring module, a performance or response-time monitor, or a storage-device monitor. A sensor may also comprise a hardware component, like a physical temperature or moisture sensor, an accelerometer, a motion detector, an intrusion alarm, or a user-accessible input device like a keyboard, mouse, or touchscreen. Each sensor 413 may be capable of transmitting occasional, periodic, or occasional output to the Operational Engine 409, depending on physical or logical characteristics of the sensor 413 or on priorities of an implementer.

In step 505, the processor receives an input generated by one or more sensors 413 and intercepted by the Operational Engine 409 module. In some embodiments, the processor, optionally by means of the Operational Engine 409, may request or otherwise trigger input from one or more specific sensors 413. In other embodiments, the sensors 413 may themselves determine when an input is sent to the Operational Engine 409.

This input may be in any format known in the art, such as a sample of a continuous output of a temperature sensor, a record of a database transaction, a report of a storage-device's available capacity that falls below a preset lower limit, an identification of a number of records, keys, or tables of a database that exceeds a preset upper limit, or any other information that might be relevant to the DBMS system. Input may also comprise information that is not relevant to the DBMS system if a sensor 413 is so designed. For example, a combination hardware/software sensor 413 that is programmed to report a disk drive's amount of available storage capacity hourly may necessarily report capacity figures regardless of whether a reported amount of available capacity indicates a condition requiring administrative action.

Embodiments of the present invention may monitor any sort of database through this mechanism. If, for example, databases 411 comprise a mixture of Oracle, SQL Server, Apache, and DB2 databases, sensors 413 may return a corresponding mixture of brand-specific inputs that each refer to one type of database. Similarly, if databases 411 comprise a mixture of relational, inverted, and flat-file databases, sensors 413 may return a corresponding mixture of structure-specific inputs.

If necessary, Operational Engine 409 may understand and resolve the inputs, using the database-inventory information stored in the knowledgebase 405 or in a storage area local to the Operational Engine 409 in order to infer meaning to each input. In this way, embodiments of the present invention may be platform-independent, providing artificially intelligent database-administration functionality to a set of databases 411 that comprise different types or brands of databases.

In some embodiments, the processor in step 505 may receive concurrent or simultaneous input from multiple sensors 413, where these multiple inputs may in aggregate identify a more complex state of one or more databases 411. For example, two sensors (or an integrated two-in-one sensor) may monitor both a database's response time and its size. In some case, reporting these two types of inputs together may allow an embodiment of the present invention to more accurately identify multi-factor conditions that depend upon both parameters. This would, for example, allow the Decision Engine 403 to infer that a database 411 is experiencing response times that exceed contractual service limits because the database 411 has accumulated too many records.

In some embodiments, the Operational Engine 409, after having received the sensor input in step 505, determines how to interpret the input as a function of the platform, operating environment, or other characteristics of the entity being monitored by the sending sensor 413. In this way, embodiments of the present invention may be platform-transparent, capable of performing DBA functions for any type of database 411 or database platform or operating environment. Regardless of a implementation-specific content or format of the received sensor input, the information forwarded by the Operational Engine 409 to the Decision Engine 403 will be understandable to the Decision Engine 403.

In steps 507, 511, and 523, the Operational Engine 409, after having optionally translated the sensor input into a form understandable by Decision Engine 403, forwards the translated input to Decision Engine 403. The Decision Engine 403 then initiates one of three possible responses to receiving sensor input in step 505. The processor chooses a response based on its identification of a type of input received, where the identification may be performed by means of known methods of artificial intelligence, using rules and facts stored in knowledgebase 405.

If the processor (either the Operational Engine 409 or the Decision Engine 403, depending on embodiment) determines that the input identifies an "issue" that may need to be resolved by an administrative action, the method of FIG. 5 proceeds with steps 513-521. In this context, an issue may be any item of interest associated with a condition that violates a contractual agreement, that does not conform to a technical constraint, or that otherwise suggests a state that requires an operational or administrative response. An issue may, for example, comprise an operating-system report of a malfunctioning storage device, a reminder to perform a scheduled backup procedure, or notice of a completion of a data-integrity scan.

In step 513, the Decision Engine 403, having used known methods of artificial intelligence, such as methods of analytics, to determine that the sensor input suggests or identifies a particular issue, applies rules and facts stored in knowledgebase 405 to identify one or more solutions to the issue. These solutions may be identified by methods of analytics or they may be identified by retrieving predefined solutions stored as semantically meaningful elements of knowledgebase 405. In some embodiments, each of these solutions may comprise an "action chain," which identifies a sequence of steps required to address the issue.

Decision Engine 403 may further assign a resolution value (RV) to each solution identified as being a candidate resolution to the identified issue. Embodiments of the present invention may accommodate any method of selecting an RV to be associated with specific solutions. Examples described in this document may identify an RV for a particular solution as a function of that solution's resource consumption. A solution that requires a greater amount of network bandwidth, processor power, time, expense, storage space, or processor RAM 305 may, for example, have a lower RV value than does an alternative solution that requires fewer, or less-critical, resources.

The Decision Engine 403 may thus rank each identified solution in an order that is a function of each solution's RV value. In the above example, solutions that require fewer resources are ranked so as to be more desirable solutions.

RV may be used in any way known in the art to associate a set of candidate resolutions. Candidate resolutions may, for example, be ranked in order of their increasing or decreasing RV values. In a more complex example, each candidate resolution may be associated with a confidence factor that identifies how successful the resolution has been in the past, when used in an attempt to resolve similar issues. In this example, each resolution's RV value might be used to weight that resolution's confidence factor, resulting in numeric values that may then be used to order or rank the candidates.

In step 515, the Decision Engine 403, using known methods of artificial intelligence, such as inferential logic or analytics, selects a best candidate solution as a function of the RV values associated with each candidate solution.

In some embodiments, the system may augment steps 513 and 515 interact with a human database administrator. This may occur, for example, if the Decision Engine 403 is unable to find any candidate solutions to the issue in question. In some embodiments, the DE 403 may routinely request that a human DBA identify a resolution or select a best candidate solution from known solutions in order to improve the quality of knowledge stored in knowledgebase 405.

In optional step 517, the Decision Engine 403 determines whether a confidence factor associated with the selected solution meets or exceeds a threshold minimum confidence factor. A confidence factor may be any value that indicates a degree of likelihood that a particular resolution is viable or is a best available resolution. A threshold minimum confidence-factor value may be determined by any means known in the art. In some cases, the threshold minimum may be selected as a mean of all confidence factors. In other cases, the threshold minimum may be selected by means of a statistical operation, such as choosing a value two standard deviations from the mean of all confidence factors initially preloaded into knowledgebase 405. Embodiments of the present invention do not require specific methods of setting the threshold minimum value and may accommodate any method preferred by an implementer.

Each candidate solution's confidence factor may be determined by any means known in the art. A candidate solution's confidence factor may, for example, initially be preloaded into knowledgebase 405. The initial stored confidence factor value may then be automatically updated, through known techniques of machine learning, as a function of how successfully the candidate solution resolves an issue each time the solution is selected. In such cases, solutions that more often resolve an issue more efficiently and effectively than do other solutions are assigned a greater confidence factor.

If the Decision Engine 403 determines in step 517 that a confidence factor associated with the selected solution meets or exceeds the threshold minimum confidence factor, the method of FIG. 5 continues with step 519. If the Decision Engine 403 determines in step 517 that a confidence factor associated with the selected solution does not meet or exceed the threshold minimum confidence factor, the method of FIG. 5 continues with step 521.

In step 519, the Decision Engine 403 instructs the Operational Engine 409 to direct hardware or software components of the DBMS system to perform steps of an action chain identified by the selected solution. These steps might, for example, comprise taking a database 411 offline, launching a database-backup utility, directing the utility to back up the database 411 to a specific storage device, returning the database 411 back online after completion of the backup, and then forwarding transaction log entries associated with the backup to the Operational Engine 409. Other steps might implement common DBA functions like reorganizing a database, creating or deleting a cluster, or reallocating space on a hard drive.

In this example, all of these steps may be performed by the DBMS itself, through its storage controllers, databases 411, and computer-readable storage devices 311. The Operational Engine 409 may manage these tasks by means of its ability to translate Decision Engine 403 directives into instructions that may be understood by the databases 411 and by other components of the operating environments in which the databases 411 reside.

In step 521, the Decision Engine 403 instructs the Operational Engine 409 to notify a human database administrator of a failure to find an appropriate resolution to the sensor-identified issue or to record an error in a transaction log that may be reviewed by an automated downstream system or by a human database administrator.

In some embodiments, if an issue cannot be resolved with confidence greater than the minimum threshold value, the system may in this step propose the highest-confidence solution to the human DBA. In some cases, the Decision Engine 403 may generate and propose a new solution by combining two or more existing candidate solutions.

In all these cases, the system seeks assistance from a DBA as part of the system's artificially intelligent self-learning capability. If the human DBA responds by allowing the system to implement the proposed solution, the Decision Engine 403 performs an action chain associated with the allowed solution and assigns an RV, confidence factor, or other ranking to the allowed solution, updating knowledgebase 405 accordingly. In this way, Decision Engine 403 can continue to enhance knowledgebase 405 by acquiring knowledge from the human DBA.

If the processor identifies the input as a "fact," the method of FIG. 5 proceeds with steps 507-509. Here, a fact, like an issue, may be an item of importance to the artificially intelligent machine-learning modules of the present invention, such as Decision Engine 403 and knowledgebase 405. In particular, the fact may update or complement any element of the process intelligence represented by information stored in knowledgebase 405.

Unlike an issue, however, a fact does not identify an issue that may potentially require a corrective administrative or operational response. A fact might, for example, update a fact or other element stored in the knowledgebase, such as a network address of a database's storage device, a revision level of an operating system, or a filename of a database-transaction log.

In step 509, the Operational Engine 409 or Decision Engine 403 updates knowledgebase 405 with information culled from the received fact. This may comprise adding a new element to the knowledgebase 405 or revising an existing element of the knowledgebase 405. Consider, for example, a case where the database inventory stored in the knowledgebase 405 identifies a hostname "DB4021.02" of a server on which a first database 411 is stored. If a received sensor input reports that the first database 411 has been moved to a different server, the processor in step 509 might update the database inventory in knowledgebase 405 to identify the new hostname reported by the sensor input.

The Decision Engine 403 might use known methods of artificially intelligence, such as analytics, to infer meaning to the received input in order to determine how to update the knowledgebase 405 in response to receiving the sensor input. In some embodiments, however, this determining may be performed by less-sophisticated means, such as by receiving an indication of a meaning of a particular sensor input, either from the sensor 413 itself or from the Operational Engine 409.

If the processor determines that the input identifies neither an issue nor a fact, the method of FIG. 5 identifies the input as a mere "event" and then proceeds with steps 523-525. Here, an event is any data received from a sensor 413 that is not considered to be an item of interest to the administrative functions of the system. Mere events do not update items of interest in the knowledgebase 405 and are not used by the Decision Engine 403 to select or perform administrative or operational functions.

In step 525, the system may store the received event in the knowledgebase 405 or in another location reserved for monitored data that cannot be considered an issue or a fact.

At the conclusion of step 509, 519, 521, or 525, the current iteration of the iterative procedure of steps 503-525 ends and the next iteration begins.

What is claimed is:

1. An artificially intelligent (DBMS) database-management system, comprising a processor, a memory coupled to the processor, a local computer-readable hardware storage device coupled to the processor, a set of databases, a set of computer-readable database-storage devices coupled to the processor that each store at least one database of the set of databases, and a set of sensors coupled to the processor that monitor parameters associated with the set of databases, the storage device containing program code configured to be run by the processor via the memory to implement a method for a database-management system with artificially intelligent database administration, the method comprising:

the processor of the DBMS system receiving input from a sensor of the set of sensors, the set of sensors including a plurality of sensors that together obtain input corresponding to every database of the set of databases;

the processor determining through artificial intelligence, as a function of information stored in a knowledgebase of the DBMS system, that the input identifies an issue that adversely affects a functioning of any database of the set of databases, each database of the set of databases being one of a plurality of distinct databases in a distributed database, where the issue adversely affects the functioning of a first database of the set of databases, where a class of the first database corresponds to a type of architecture of the first database, where the type of architecture is selected from the group consisting of relational, inverted, and flat-file database architectures, and where the input is determined as a function of the class of the first database;

the processor, in response to determining that the input identifies an issue that adversely affects a functioning of any database of the set of databases:

identifying through artificial intelligence, as a function of information stored in the knowledgebase, a set of candidate resolutions to the issue;

selecting through artificial intelligence, as a function of information stored in the knowledgebase, a candidate resolution that has a higher confidence of being successful than do other resolutions of the set of candidate resolutions;

performing steps the selected candidate resolution upon the set of databases;

analyzing, in response to the performing of the steps of the selected candidate resolution, further input from the set of sensors to determine an effectiveness of the selected candidate resolution in resolving the issue; and updating the knowledgebase as a function of the selecting and of the analyzing.

2. The system of claim 1, where the DBMS system further comprises an interactive user interface and where the method further comprises:

the processor, prior to the performing, communicating the system's selection to a human database administrator through the interactive user interface; and the processor receiving in response to the communicating a communication from the human database administrator indicating whether a step of the selected candidate resolution should be revised prior to the performing.

3. The system of claim 1, where the performing further comprises directing, by an operational engine that manages the plurality of distinct databases in the distributed database, one or more of the database-storage devices to perform actions requested by a decision engine utilizing the artificial intelligence that improve an efficiency or an accuracy of one or more of the set of databases.

4. The system of claim 1, where the set of sensors comprise hardware devices capable of monitoring physical characteristics associated with the set of databases, the physical characteristics including external air temperatures and media temperatures.

5. The system of claim 1, where the set of sensors comprise computer software capable of monitoring a parameter associated with the set of databases.

6. The system of claim 1, where the DBMS system further comprises:

an artificially intelligent decision engine capable of:

inferring, through artificial intelligence and as a function of information stored in the knowledgebase, whether input received from a sensor of the set of sensors identifies an issue that adversely affects an efficiency or an accuracy of the set of databases, and selecting and ranking, through artificial intelligence and as a function of information stored in the knowledgebase, administrative and operational database-administration tasks capable of resolving the identified issue; and a software-based operational engine that interfaces the decision engine to the set of sensors, the set of databases, and the set of database-storage devices, such that the decision engine may operate correctly regardless of a choice of each database's operating platform and internal structure, and where the interfacing comprises translating communications exchanged with the engine between a format capable of being understood by the decision engine and a format capable of being understood by a recipient database of the set of databases.

7. The system of claim 6, further comprising:

the processor preloading the knowledgebase, prior to the receiving input, with rules and concepts from which the decision engine, through artificial intelligence, is capable of inferring meaning to input received from the set of sensors and by which, through artificial intelligence, the decision engine is capable of selecting and ranking candidate resolutions.

8. The system of claim 6, further comprising:

the decision engine of the system determining further, as a function of information stored in the knowledgebase, that the received input identifies a fact capable of influencing a determination made by the decision engine, but which does not affect an efficiency or an accuracy of the set of databases; and the processor, in response to the determining further, storing the fact in the knowledgebase.

9. The system of claim 6, where the performing further comprises:

the decision engine of the system communicating to the operational engine instructions for implementing steps of the selected candidate resolution; and the operational engine of the system, in response to the communicating, directing the set of database-storage devices to execute the steps of the selected candidate resolution, where each step comprises performing an operation upon the set of databases necessary to resolve the issue.

10. A method for a database-management system with artificially intelligent database administration, the method comprising:

a processor of an artificially intelligent (DBMS) database-management system receiving input from a sensor of a set of sensors, where the set of sensors monitors parameters associated with a set of databases, the set of sensors including a plurality of sensors that together obtain input corresponding to every database of the set of databases;

the processor determining through artificial intelligence, as a function of information stored in a knowledgebase of the DBMS system, that the input identifies an issue that adversely affects a functioning of any database of the set of databases, each database of the set of databases being one of a plurality of distinct databases in a distributed database, where the issue adversely affects the functioning of a first database of the set of databases, where a class of the first database corresponds to a type of architecture of the first database, where the type of architecture is selected from the group consisting of relational, inverted, and flat-file database architectures, and where the input is determined as a function of the class of the first database;

the processor, in response to determining that the input identifies an issue that adversely affects a functioning of any database of the set of databases:

identifying through artificial intelligence, as a function of information stored in the knowledgebase, a set of candidate resolutions to the issue;

selecting through artificial intelligence, as a function of information stored in the knowledgebase, a candidate resolution that has a higher confidence of being successful than do other resolutions of the set of candidate resolutions;

communicating the selection to a human database administrator through the interactive user interface;

receiving in response to the communicating a communication from the human database administrator indicating whether a step of the selected candidate resolution should be revised prior to the performing;

performing steps of the selected candidate resolution upon the set of databases by directing, by an operational engine that manages the plurality of distinct databases in the distributed database, one or more database-storage devices, which each store at least one database of the set of databases, to perform actions requested by a decision engine utilizing the artificial intelligence that improve an efficiency or an accuracy of one or more of the set of databases;

analyzing, in response to the performing of the steps of the selected candidate resolution, further input from the set of sensors to determine an effectiveness of the selected candidate resolution in resolving the issue; and updating the knowledgebase as a function of the selecting and of the analyzing.

11. The method of claim 10, where the set of sensors is selected from a group consisting of: hardware devices capable of monitoring a physical characteristic associated with the set of databases and computer software capable of monitoring a parameter associated with the set of databases.

12. The method of claim 10, where the DBMS system further comprises:

an artificially intelligent decision engine capable of:

inferring meaning to input received from the set of sensors, through artificial intelligence and as a function of information stored in the knowledgebase, where the inferred meaning indicates whether input received from a sensor of the set of sensors identifies an issue that adversely affects an efficiency or an accuracy of the set of databases, and selecting and ranking, through artificial intelligence and as a function of information stored in the knowledgebase, administrative and operational database-administration tasks capable of resolving the identified issue; and a software-based operational engine that interfaces the decision engine to the set of sensors, the set of databases, and the set of database-storage devices, such that the decision engine may operate correctly regardless of a choice of each database's operating platform and internal structure, and where the interfacing comprises translating communications exchanged with the engine between a format capable of being understood by the decision engine and a format capable of being understood by a recipient database of the set of databases.

13. The method of claim 12, further comprising:

the decision engine of the system determining further, as a function of information stored in the knowledgebase, that the received input identifies a fact capable of influencing a determination made by the decision engine, but which does not affect an efficiency or an accuracy of the set of databases; and the processor, in response to the determining further, storing the fact in the knowledgebase.

14. The method of claim 12, where the performing further comprises:

the decision engine of the system communicating to the operational engine instructions for implementing steps of the selected candidate resolution; and the operational engine of the system, in response to the communicating, directing the set of database-storage devices to execute the steps of the selected candidate resolution, where each step comprises performing an operation upon the set of databases necessary to resolve the issue.

15. The method of claim 10, further comprising providing at least one support service for at least one of creating, integrating, hosting, maintaining, and deploying computer-readable program code in the computer system, wherein the computer-readable program code in combination with the computer system is configured to implement the receiving, the determining, the identifying, the selecting, the performing and the updating.

16. A computer program product, comprising a computer-readable hardware storage device having a computer-readable program code stored therein, the program code configured to be executed by an artificially intelligent (DBMS) database-management system, comprising a processor, a memory coupled to the processor, a local computer-readable hardware storage device coupled to the processor, a set of databases, a set of computer-readable database-storage devices coupled to the processor that each store at least one database of the set of databases, and a set of sensors coupled to the processor that monitor parameters associated with the set of databases, the storage device containing program code configured to be run by the processor via the memory to implement a method for a database-management system with artificially intelligent database administration, the method comprising:

the processor receiving input from a sensor of the set of sensors;

the processor determining through artificial intelligence, as a function of information stored in a knowledgebase of the DBMS system, that the input identifies an issue that adversely affects a functioning of any database of the set of databases, each database of the set of databases being one of a plurality of distinct databases in a distributed database, where the issue adversely affects the functioning of a first database of the set of databases, where a class of the first database corresponds to a type of architecture of the first database, where the type of architecture is selected from the group consisting of relational, inverted, and flat-file database architectures, and where the input is determined as a function of the class of the first database;

the processor, in response to determining that the input identifies an issue that adversely affects a functioning of any database of the set of databases:

identifying through artificial intelligence, as a function of information stored in the knowledgebase, a set of candidate resolutions to the issue;

selecting through artificial intelligence, as a function of information stored in the knowledgebase, a candidate resolution that has a higher confidence of being successful than do other resolutions of the set of candidate resolutions;

communicating the selection to a human database administrator through the interactive user interface;

receiving in response to the communicating a communication from the human database administrator indicating whether a step of the selected candidate resolution should be revised prior to the performing;

performing steps of the selected candidate resolution upon the set of databases by directing, by an operational engine that manages the plurality of distinct databases in the distributed database, one or more storage devices of the set of database-storage devices to perform actions requested by a decision engine utilizing the artificial intelligence that improve an efficiency or an accuracy of one or more of the set of databases;

analyzing, in response to the performing of the steps of the selected candidate resolution, further input from the set of sensors to determine an effectiveness of the selected candidate resolution in resolving the issue; and updating the knowledgebase as a function of the selecting and of the analyzing.

17. The computer program product of claim 16, where the set of sensors is selected from a group consisting of: hardware devices capable of monitoring a physical characteristic associated with the set of databases and computer software capable of monitoring a parameter associated with the set of databases.

18. The computer program product of claim 16, where the DBMS system further comprises:

an artificially intelligent decision engine capable of:

inferring meaning to input received from the set of sensors, through artificial intelligence and as a function of information stored in the knowledgebase, where the inferred meaning indicates whether input received from a sensor of the set of sensors identifies an issue that adversely affects an efficiency or an accuracy of the set of databases, and selecting and ranking, through artificial intelligence and as a function of information stored in the knowledgebase, administrative and operational database-administration tasks capable of resolving the identified issue; and a software-based operational engine that interfaces the decision engine to the set of sensors, the set of databases, and the set of database-storage devices, such that the decision engine may operate correctly regardless of a choice of each database's operating platform and internal structure, and where the interfacing comprises translating communications exchanged with the engine between a format capable of being understood by the decision engine and a format capable of being understood by a recipient database of the set of databases.

19. The computer program product of claim 18, further comprising:

the decision engine of the system determining further, as a function of information stored in the knowledgebase, that the received input identifies a fact capable of influencing a determination made by the decision engine, but which does not affect an efficiency or an accuracy of the set of databases; and the processor, in response to the determining further, storing the fact in the knowledgebase.

20. The computer program product of claim 18, where the performing further comprises:

the decision engine of the system communicating to the operational engine instructions for implementing steps of the selected candidate resolution; and the operational engine of the system, in response to the communicating, directing the set of database-storage devices to execute the steps of the selected candidate resolution, where each step comprises performing an operation upon the set of databases necessary to resolve the issue.

* * * * *